May 13, 1952   E. H. JORDAN   2,596,411
MOTORCYCLE AND ITS FRONT STEERING FORK
Filed Dec. 26, 1947   2 SHEETS—SHEET 2
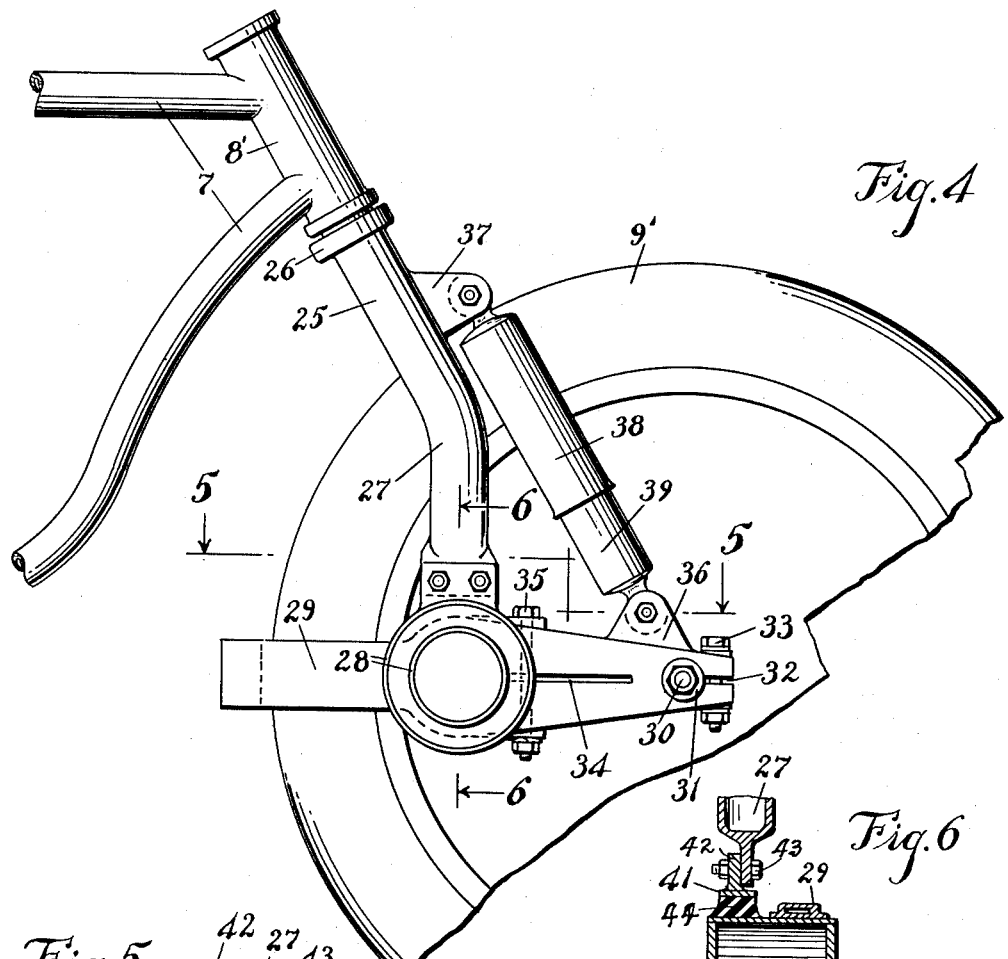
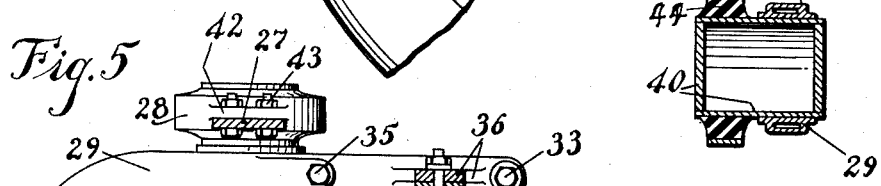
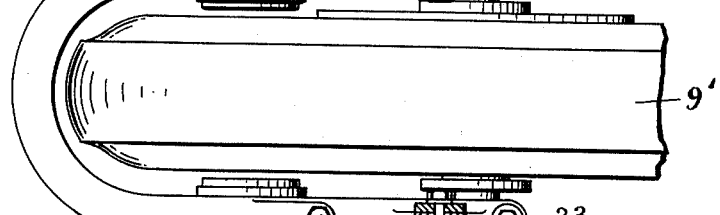
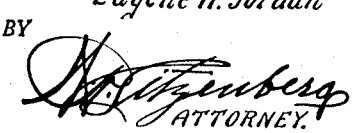
INVENTOR.
Eugene H. Jordan
BY
ATTORNEY.

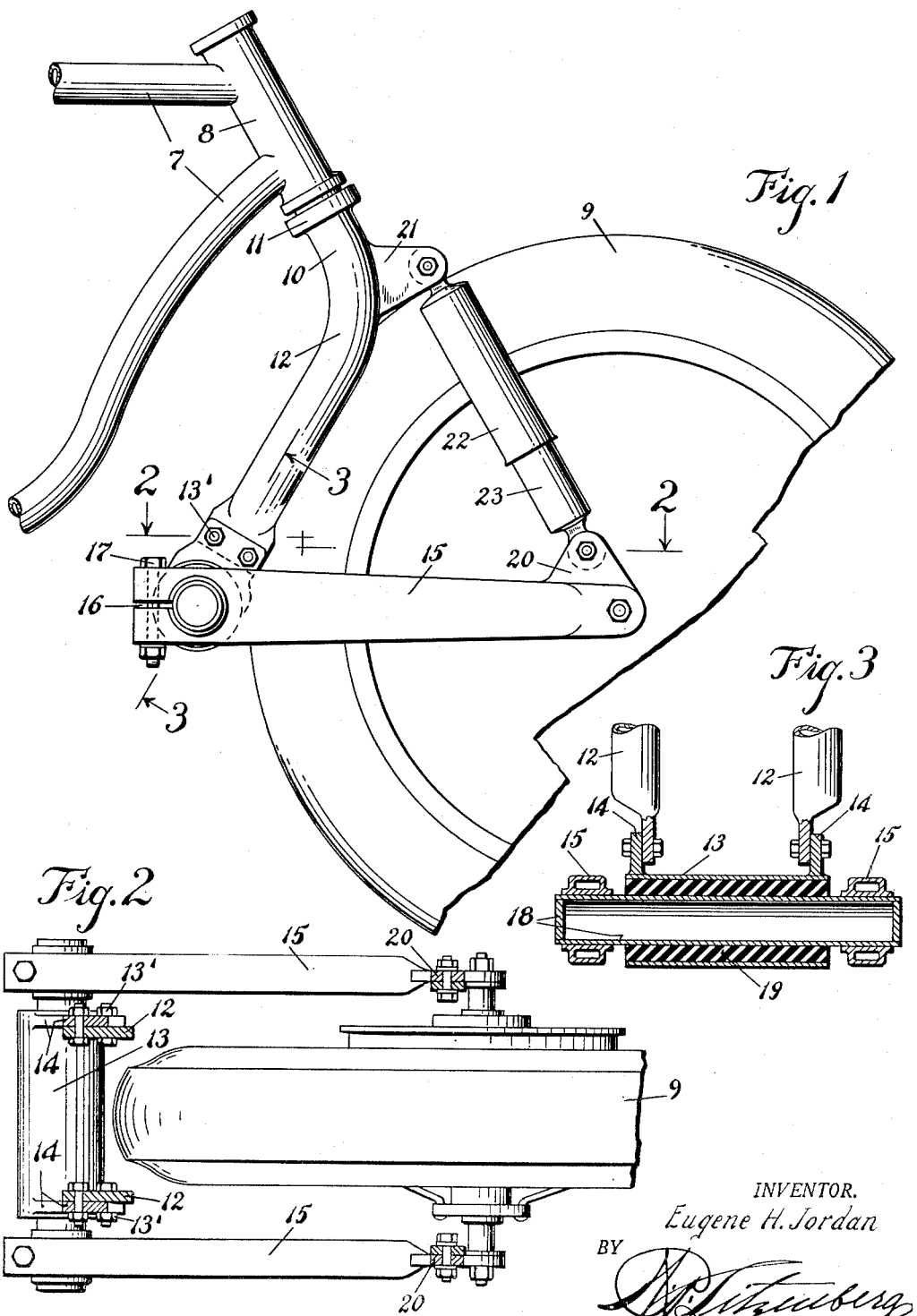

Patented May 13, 1952

2,596,411

UNITED STATES PATENT OFFICE 2,596,411

MOTORCYCLE AND ITS FRONT STEERING FORK

Eugene H. Jordan, Los Angeles, Calif.

Application December 26, 1947, Serial No. 794,003

4 Claims. (Cl. 280—276)

This invention relates to motorcycles, or other vehicles in which there is a front steering fork connected with the front wheel, and by means of which the front wheel can be turned in steering, and it has among its salient objects to provide a new and useful improvement in the way said steering fork is connected with said wheel in order to provide for up and down movement of the front fork and frame relative to the wheel.

In some vehicles of this character, the front fork straddles the wheel in a straight radial position relative to the wheel axle, or to a point slightly to one side of the axis of the wheel, with spring means provided so that there can be a yielding movement of the front end of the frame and front fork on a line to one side of the axis of the wheel.

This invention has as its main object to provide in connection with the steering head of a vehicle, a steering fork mechanism from said head to said wheel which will give greater resiliency between the wheel and the frame, and which will permit the wheel to vibrate over rough surfaces with a minimum of transmission of the vibration to the frame and to the rider.

In accomplishing this, I have provided a steering fork mechanism which recedes from the head line at an angle thereto, and connects with a horizontal fork structure, rearwardly of the wheel axis, with means in said connection for furnishing the resiliency for the vertical movement of the frame relative to the wheel, or of the wheel up and down relative to the frame.

I have also provided in connection with such a mounting, a supplemental resiliency-furnishing means between the axis of the wheel and a point on said steering fork mechanism.

To provide these improved main features with practical structural mountings and connections therefor, are among the inventive features of this application. Other advantages and desirable features will appear in connection with the following more detailed description of the invention, taken in connection with the accompanying two sheets of drawings showing the embodiment of the invention used for explanatory purposes. In the drawings:

Figure 1 is a fragmentary side elevation of the front end of a vehicle, showing my invention embodied therein;

Figure 2 is a sectional view taken on line 2—2 of Fig. 1;

Figure 3 is a sectional view taken on line 3—3 of Fig. 1;

Figure 4 is a view similar to Fig. 1, with a slightly modified structure;

Figure 5 is a fragmentary sectional view taken on the line 5—5 of Fig. 4; and

Figure 6 is a detailed sectional view taken on the line 6—6 of Fig. 4.

Referring now in detail to the drawings, I have shown the invention embodied in the frame structure of a motocycle, bicycle, three-wheeled or other type of vehicle, using a front steering fork mechanism of the character referred to.

The frame structure, or body, in the forms here used, is designated 7, the head 8, and the wheel 9. My invention has to do with the mechanism connecting the head 8 with the wheel 9, whereby to provide for the desired resiliency between the frame head and wheel.

In Figs. 1, 2 and 3, a steering fork mechanism is designated 10 at its connection with the head 8, and includes a cross bar 11 having two rearwardly inclined members, as 12, shown connected with the opposite ends of a bearing structure, designated 13, by means of bolts 13', said bearing member having upstanding flange portions, or lugs, as 14, 14, with which the ends of said inclined members 12 connect, as is clear from Figs. 2 and 3.

Rearwardly extending from the axis of the wheel 9, at opposite sides thereof, are two arms, 15, 15, having their rearward ends split, as at 16, and provided with a through bolt 17, said arms forming bearings or mountings for the opposite ends of the bearing structure 13.

By reference to Fig. 3, said bearing structure 13, includes an inner member 18, shown of tubular form, having its opposite ends held in the rearward ends of the arms 15, 15, and around which member 18 is a cylindrical body 13 of the bearing structure.

Between said inner member 18, and said cylindrical body 13, I provide means for torsional resiliency. In this showing, I have indicated a rubber-like intermediate member, designated 19, secured to the surface of the member 18, and to the inner surface of the cylindrical body 13, whereby to give resiliency between said member 18 and said body 13 as they are rotated relative to each other.

Each of the horizontal arms 15, at the wheel axis end is provided on its upper side with an upstanding lug 20, and each of the rearwardly inclined members 12, below their connecting cross bar 11, is provided with a forwardly extending lug 21. Between these two lug members 20 and 21, on both sides of the wheel 9, are mounted two pairs of supplemental hydraulic shock absorber or spring control cylinders, 22—23, pivotally connected, as indicated, and functioning to supplement the resiliency furnished by the resilient connection in the bearing structure 13, before referred to.

Referring to Figs. 4, 5 and 6, a slight modification is shown in which the steering fork mechanism, designated 25, attached by a cross bar 26, to the head 8', has two rearwardly inclined members, as 27. These two members do not incline as far rearwardly as do the members 12, in the other embodiment of the invention, but are connected with individual bearing structures, as 28, 28, mounted in the opposite sides of a horizontal yoke, or U-shaped member, 29, the ends of which yoke are connected with the ends of the axle 30 of the wheel 9', as at 31, said ends being split, as at 32, and fastened by means of bolts, as 33. The arms of said yoke member 29, near the bearing structures 28, 28, are split, as at 34, with through bolts 35, whereby the tension of said arms on said bearing structures can be tightened. It will be noted that the yoke or U-shaped member 29, extends from the axle 30 of the wheel around the rim of said wheel, and that the connections of the rearwardly inclined members 27, 27, are between said axle and the rim of the wheel, whereas, in the other modification of the invention, shown in Figs. 1 and 2, the rearwardly inclined members 12, 12, are connected rearwardly of the rim of the wheel, which increases the leverage from the axle to the connection.

The forward ends of the arms of the yoke 29, are provided with upstanding lugs, as 36, and the members 25, 25, are provided with forwardly projecting lugs, as 37, and between these two pairs of lugs, at opposite sides of the wheel 9', are connected two pairs of shock controlling cylinders 38—39, as in Fig. 1. This constitutes a supplemental cushioning or resilient means between the frame and the wheel.

The bearing structures 28, 28, as seen in Fig. 6, each includes an inner member 40, one end of which is secured in one arm of the yoke 29, at the rearward end of the split 34, and secured in place with the bolt 35, while the outer end thereof receives an outer cylindrical member 41, having the lug portions 42 thereon, and to which the rearwardly inclined members 27, 27, are secured by bolts 43. Between the inner member 40, and the outer cylindrical member 41, is the torsional member 44, indicated as rubber in the showing, whereby relative rotation between the member 40, and the member 41, connected, respectively, with the yoke 29, and the wheel axle, 30, and the steering fork 27, as illustrated, to give a resilient connection therebetween, and which is supplemented by the cylinders 38—39, as before described.

Thus I have provided a construction in which the vehicle frame structure and its head are connected with the wheel axle by a construction which furnishes angularly connected lever means, with torsional resiliency means operable around the pivotal connection between said lever means, and with supplemental resiliency means operable in connection therewith.

I claim:

1. In a motorcycle, the combination with a frame and wheel on which said frame is supported, of means interposed between said frame and said wheel for providing resiliency therebetween, said means including two rigid horizontal arms extending from the opposite ends of the wheel axle rearwardly along the opposite sides of said wheel and connected together rearwardly of said wheel, a rigid inclined fork member rotatable at its upper end in the frame head with its forks extended rearwardly and connected with the rearward portions of said horizontal arms, and a pivotal connection between the ends of the forks of said rigid inclined fork member and said horizontal arms, said connection including as a part thereof means causing resilient torsional resistance to relative pivotal movement of said member and arms.

2. In a motorcycle, the combination with a frame and front wheel on which said frame is supported, of means interposed between said frame and said wheel for providing resiliency therebetween, said means including two horizontal arms extending from the opposite ends of the wheel axle rearwardly along the opposite sides of said wheel and connected together rearwardly of said wheel, a rigid rearwardly inclined steering fork rotatably connected at its upper end in the head of said frame and at the rearward ends of its forks pivotally connected with the rearward ends of said horizontal arms, said pivotal connection including therein as a part thereof means for causing resilient torsional resistance to relative pivotal movement of said member and arms, and a connection from the forward ends of said horizontal arms near the axle of said wheel to the upper part of said inclined steering fork, said connection being in the form of a telescoping shock absorber.

3. In a vehicle having a supporting frame and a front steering wheel, means for resiliently connecting said wheel to said frame, said means including a horizontal yoke-like member connected at its two forward ends with the ends of the axle of said wheel, with its yoke portion extended around the rim and tire of said wheel, a rigid steering fork member rotatably supported at its upper end in the head of said frame and at its lower end having the ends of its forks pivotally connected to the connected ends of said yoke-like member, said pivotal connections with said yoke-like member having means therein for causing torsional resilient resistance to pivotal movement relatively of said arms and the lower end of said rigid steering fork member, and telescoping shock absorbing members connected, respectively, to the axle end of said yoke arms and to the upper part of said rigid member, for the purpose described.

4. In a vehicle, in combination: a supporting frame and a front steering wheel, and means for resiliently connecting said wheel to said frame, said means including a triangular structure having its apex connected rotatably in the head of said frame for steering, the base of said triangular structure consisting of a yoke having its two ends connected with the opposite ends of the axle of said wheel, and its body extended horizontally along the opposite sides of said wheel and connected rearwardly of said wheel rim and tire, the front member of said triangular structure being a shock absorber connected at one end to the axle end of said base and at its other end to the apex part of said structure, and the rearward side of said triangular structure being rigidly connected at its upper end to the apex part of said triangular structure, and at its lower end pivotally connected to said yoke with means forming a part of said pivotal connection for causing torsional resilient resistance to relative pivotal movement.

EUGENE H. JORDAN.

REFERENCES CITED

The following references are of record in the file of this patent:

UNITED STATES PATENTS

| Number | Name | Date |
|---|---|---|
| 1,331,747 | Fisker | Feb. 24, 1920 |
| 1,422,671 | Cochran | July 11, 1922 |
| 2,162,198 | Herrington | June 13, 1939 |
| 2,264,023 | Faber | Nov. 25, 1941 |
| 2,396,579 | Krotz | Mar. 12, 1946 |

FOREIGN PATENTS

| Number | Country | Date |
|---|---|---|
| 49,232 | Germany | Oct. 23, 1889 |
| 47,160 | France | Nov. 7, 1936 |
| 346,801 | France | Dec. 10, 1904 |
| 128,391 | Great Britain | June 18, 1919 |
| 521,258 | Great Britain | May 16, 1940 |
| 579,861 | Great Britain | Aug. 19, 1946 |